«12» United States Patent
Yoshida et al.

(10) Patent No.: US 9,158,062 B2
(45) Date of Patent: Oct. 13, 2015

(54) ILLUMINATION APPARATUS, IMAGE SENSOR UNIT, AND IMAGE READING APPARATUS

(71) Applicant: CANON COMPONENTS, INC., Kodama-gun, Saitama (JP)

(72) Inventors: Hidemasa Yoshida, Saitama (JP); Yoshihiko Tsumekawa, Saitama (JP)

(73) Assignee: CANON COMPONENTS, INC. (JP)

( * ) Notice: Subject to any disclaimer, the term of this patent is extended or adjusted under 35 U.S.C. 154(b) by 0 days.

(21) Appl. No.: 14/474,738

(22) Filed: Sep. 2, 2014

(65) Prior Publication Data

US 2015/0062670 A1 Mar. 5, 2015

(30) Foreign Application Priority Data

Sep. 3, 2013 (JP) .................................. 2013-182384
Aug. 27, 2014 (JP) .................................. 2014-172693

(51) Int. Cl.
| H04N 1/04 | (2006.01) |
| F21V 8/00 | (2006.01) |
| G01J 1/04 | (2006.01) |
| H04N 1/024 | (2006.01) |
| H04N 1/028 | (2006.01) |

(52) U.S. Cl.
CPC ............. *G02B 6/0096* (2013.01); *G01J 1/0407* (2013.01); *H04N 1/0289* (2013.01); *H04N 1/02418* (2013.01); *H04N 1/02835* (2013.01); *H04N 2201/0081* (2013.01); *H04N 2201/0094* (2013.01); *H04N 2201/02456* (2013.01); *H04N 2201/02462* (2013.01); *H04N 2201/02493* (2013.01); *H04N 2201/02497* (2013.01)

(58) Field of Classification Search
CPC .......... H04N 2201/02435; H04N 2201/02456; H04N 2201/02458; H04N 2201/02462; H04N 2201/0081; H04N 2204/03166; H04N 2201/0418
USPC .............. 358/474, 475, 1.9, 509; 399/289, 45
See application file for complete search history.

(56) References Cited

U.S. PATENT DOCUMENTS

| 7,679,793 B2 * | 3/2010 | Oguchi ........................... 358/487 |
| 7,796,310 B2 * | 9/2010 | Hasegawa et al. ............. 358/488 |
| 8,619,339 B2 * | 12/2013 | Fukutome et al. ............ 358/461 |
| 8,717,514 B2 * | 5/2014 | Minoura et al. ................ 349/65 |
| 2006/0250594 A1 * | 11/2006 | Iwashita et al. .................. 355/53 |
| 2012/0162727 A1 | 6/2012 | Shimoda et al. |
| 2014/0347596 A1 * | 11/2014 | Ikuta .............................. 349/58 |
| 2014/0355303 A1 * | 12/2014 | Fujiuchi et al. ................ 362/611 |

FOREIGN PATENT DOCUMENTS

JP           2012142738 A      7/2012

* cited by examiner

*Primary Examiner* — Negussie Worku
(74) *Attorney, Agent, or Firm* — Rossi, Kimms & McDowell LLP

(57) ABSTRACT

An illumination apparatus includes: a rod-like light guide member that directs light emitted from a first light source and a second light source from an emission surface to an illuminated body while propagating the light by reflection surfaces; and a light blocking member including a second surrounding portion slidably covering another end of the light guide member, wherein the second surrounding portion includes: a light blocking portion protruding toward one end of the light guide member and covering the emission surface of the light guide member; and a cut-out portion adjacent to the light blocking portion and exposing the reflection surface of the light guide member.

9 Claims, 14 Drawing Sheets ously. Patent Document 1
ILLUMINATION APPARATUS, IMAGE SENSOR UNIT, AND IMAGE READING APPARATUS

CROSS-REFERENCE TO RELATED APPLICATIONS

This application is based upon and claims the benefit of priority of the prior Japanese Patent Application No. 2013-182384, filed on Sep. 3, 2013, and the Japanese Patent Application No. 2014-172693, filed on Aug. 27, 2014, the entire contents of which are incorporated herein by reference.

BACKGROUND OF THE INVENTION

1. Field of the Invention

The present invention relates to an illumination apparatus, an image sensor unit, and an image reading apparatus.

2. Description of the Related Art

An image sensor unit and the like including a light source, a light guide, and the like are known. Patent Document 1 discloses an image sensor unit including a freely slidable light blocking member loosely inserted at a position covering a free end of the light guide in the longitudinal direction. In the image sensor unit of Patent Document 1, the light blocking member can block leak light directly emitted from between the free end of the light guide and the light source toward the original to thereby prevent the generation of leak light even if the light guide is expanded or contracted due to the ambient temperature or the like.
Patent Document 1
Japanese Laid-open Patent Publication 2012-142738
However, although the light blocking member of the image sensor unit can block the leak light emitted from the light source toward the original, the light incident on the light blocking member and directly reflected by the inner surface of the light blocking member may leak from the free end side. Particularly, the inner surface of the light blocking member is exposed when the light guide is contracted, compared to when the light guide is expanded. Therefore, more light is directly reflected to the inner surface of the light blocking member, and more leak light is generated. As a result, the leak light varies in response to the expansion and contraction of the light guide due to the ambient temperature, and making the illuminance on the original uniform is difficult.

SUMMARY OF THE INVENTION

The present invention has been made in view of the problem, and an object of the present invention is to make illuminance on an illuminated body uniform even if a light guide member is expanded or contracted.

The present invention provides an illumination apparatus that linearly illuminates an illuminated body, the illumination apparatus including: a first light source; a second light source; a rod-like light guide member, wherein the first light source is arranged on one end in a longitudinal direction, the second light source is arranged on another end in the longitudinal direction, light emitted from the first light source and the second light source is propagated by a reflection surface and emitted to the illuminated body from an emission surface, the one end is a fixed end, and the other end is a free end; and a light blocking member including a surrounding portion slidably covering the other end of the light guide member, wherein the surrounding portion includes: a light blocking portion protruding toward the one end of the light guide member and covering the emission surface of the light guide member; and a cut-out portion adjacent to the light blocking portion and exposing part of the reflection surface of the light guide member.

The present invention provides an image sensor unit including: the illumination apparatus; a light condenser that focuses reflected light from the illuminated body; and an image sensor that receives the light focused by the light condenser to convert the light to an electric signal.

The present invention provides an image reading apparatus including: the image sensor unit; and a movement portion that relatively moves the image sensor unit and the illuminated body.

DETAILED DESCRIPTION OF THE PREFERRED EMBODIMENTS

Embodiments of the present invention will be described in detail with reference to the drawings. The embodiments include an illumination apparatus, an image sensor unit 10 provided with the illumination apparatus, and an image reading apparatus as well as an image forming apparatus provided with the image sensor unit 10. In the image reading apparatus and the image forming apparatus, the image sensor unit 10 emits light to an original P as an illuminated body and converts reflected light to an electrical signal to read an image.

In the following description, three-dimensional directions will be indicated by arrows X, Y, and Z. An X direction indicates a main-scan direction, a Y direction indicates a sub-scan direction perpendicular to the main-scan direction, and a Z direction indicates a perpendicular direction (vertical direction).

(First Embodiment)

Figure 2:
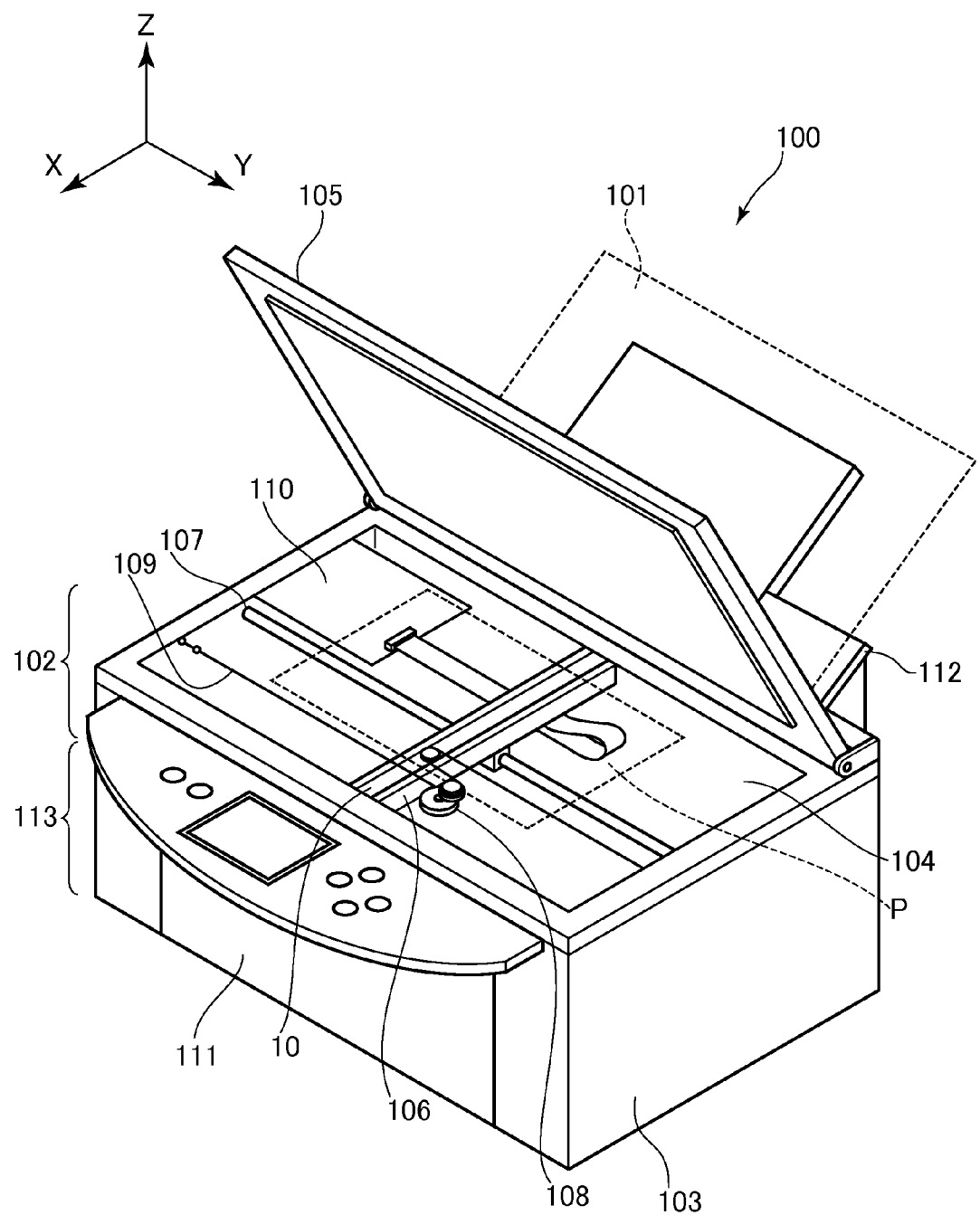
FIG. 2 is a perspective view illustrating an appearance of an MFP 100 including an image sensor unit 10.

A structure of a multi-function printer (MFP) as an example of the image reading apparatus or the image forming apparatus according to the present embodiment will be described with reference to FIG. 2. FIG. 2 is a perspective view illustrating an appearance of an MFP 100. As illustrated in FIG. 2, the MFP 100 includes: an image reading portion 102 as image reading means for reading reflected light from the original P; and an image forming portion 113 as image forming means for forming (printing) an image of the original P on a sheet 101 (recording paper) as a recording medium.

The image reading portion 102 has a function of a so-called image scanner and has the following configuration, for example. The image reading portion 102 includes: a housing 103; a platen glass 104 made of a transparent glass plate as an original placement portion; and a platen cover 105 that can be freely opened and closed relative to the housing 103 to allow covering the original P.

The housing 103 houses the image sensor unit 10 including the illumination apparatus, a holding member 106, an image sensor unit slide shaft 107, an image sensor unit drive motor 108, a wire 109, a signal processing portion 110, a recovery unit 111, a paper feeding tray 112, and the like.

The image sensor unit 10 is, for example, a contact image sensor (CIS) unit. The holding member 106 surrounds and holds the image sensor unit 10. The image sensor unit slide shaft 107 guides the holding member 106 in the sub-scan direction along the platen glass 104. The image sensor unit drive motor 108 is a movement portion that relatively moves the image sensor unit 10 and the original P, and specifically, the image sensor unit drive motor 108 moves the wire 109 attached to the holding member 106. The recovery unit 111, which can be freely opened and closed relative to the housing 103, recovers the printed sheet 101. The paper feeding tray 112 houses the sheet 101 in a predetermined size.

In the image reading portion 102 configured as described above, the image sensor unit drive motor 108 moves the image sensor unit 10 in the sub-scan direction along the image sensor unit slide shaft 107. In this case, the image sensor unit 10 optically reads the original P placed on the platen glass 104 to convert the original P to an electric signal to perform reading operation of an image.

Figure 3:
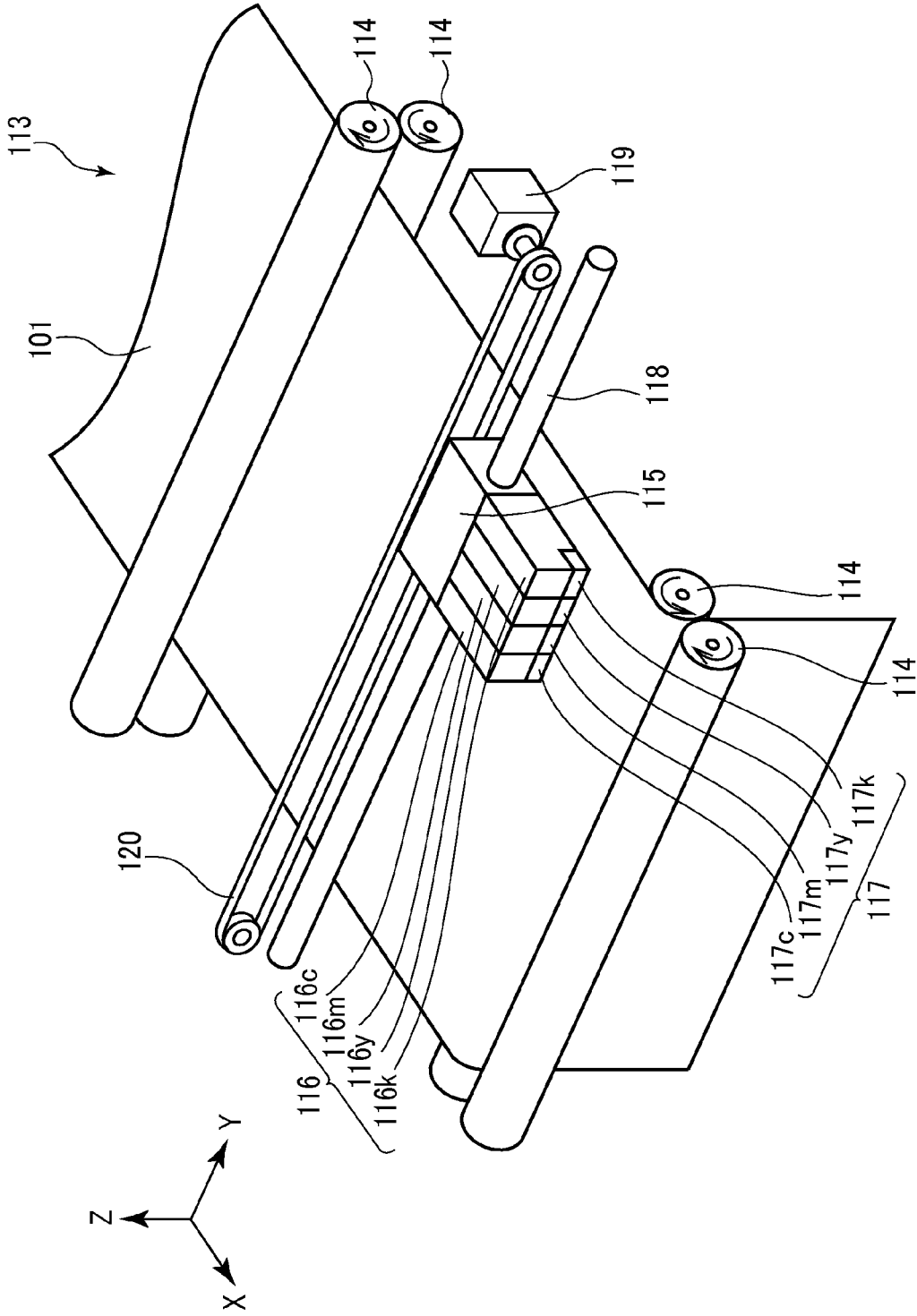
FIG. 3 is a schematic view illustrating a structure of an image forming portion 113 of the MFP 100.

FIG. 3 is a schematic view illustrating a structure of the image forming portion 113.

The image forming portion 113 has a function of a so-called printer and has the following configuration, for example. The image forming portion 113, housed in the housing 103, includes conveyor rollers 114 and a recording head 115 as illustrated in FIG. 3. The recording head 115 includes, for example, ink tanks 116 (116c, 116m, 116y, and 116k) with cyan C, magenta M, yellow Y, and black K inks and discharge heads 117 (117c, 117m, 117y, and 117k) arranged on the ink tanks 116, respectively. The image forming portion 113 includes a recording head slide shaft 118, a recording head drive motor 119, and a belt 120 attached to the recording head 115.

In the image forming portion 113 configured as described above, the conveyor rollers 114 convey the sheet 101 supplied from the paper feeding tray 112 to the recording position. The recording head drive motor 119 mechanically moves the belt 120, and the recording head 115 performs printing on the sheet 101 based on an electric signal while moving in the printing direction (main-scan direction) along the recording head slide shaft 118. The operation is repeated until the printing is finished, and the conveyor rollers 114 eject the printed sheet 101 to the recovery unit 111.

Although an inkjet-type image forming apparatus has been described as the image forming portion 113, the type can be any type, such as an electrophotographic type, a thermal transfer type, and a dot impact type.

Figure 4:
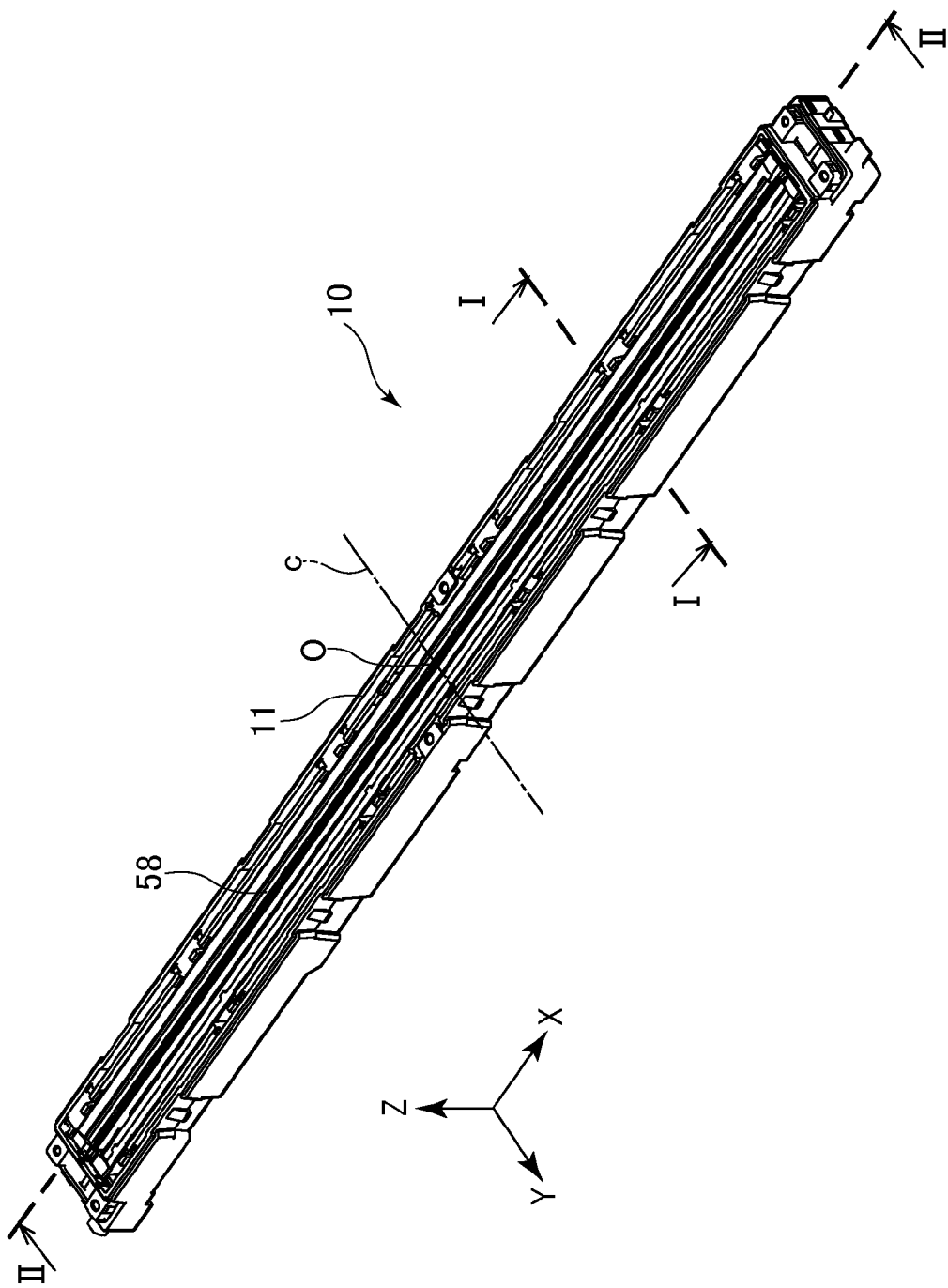
FIG. 4 is a perspective view of the image sensor unit 10.
Figure 5:
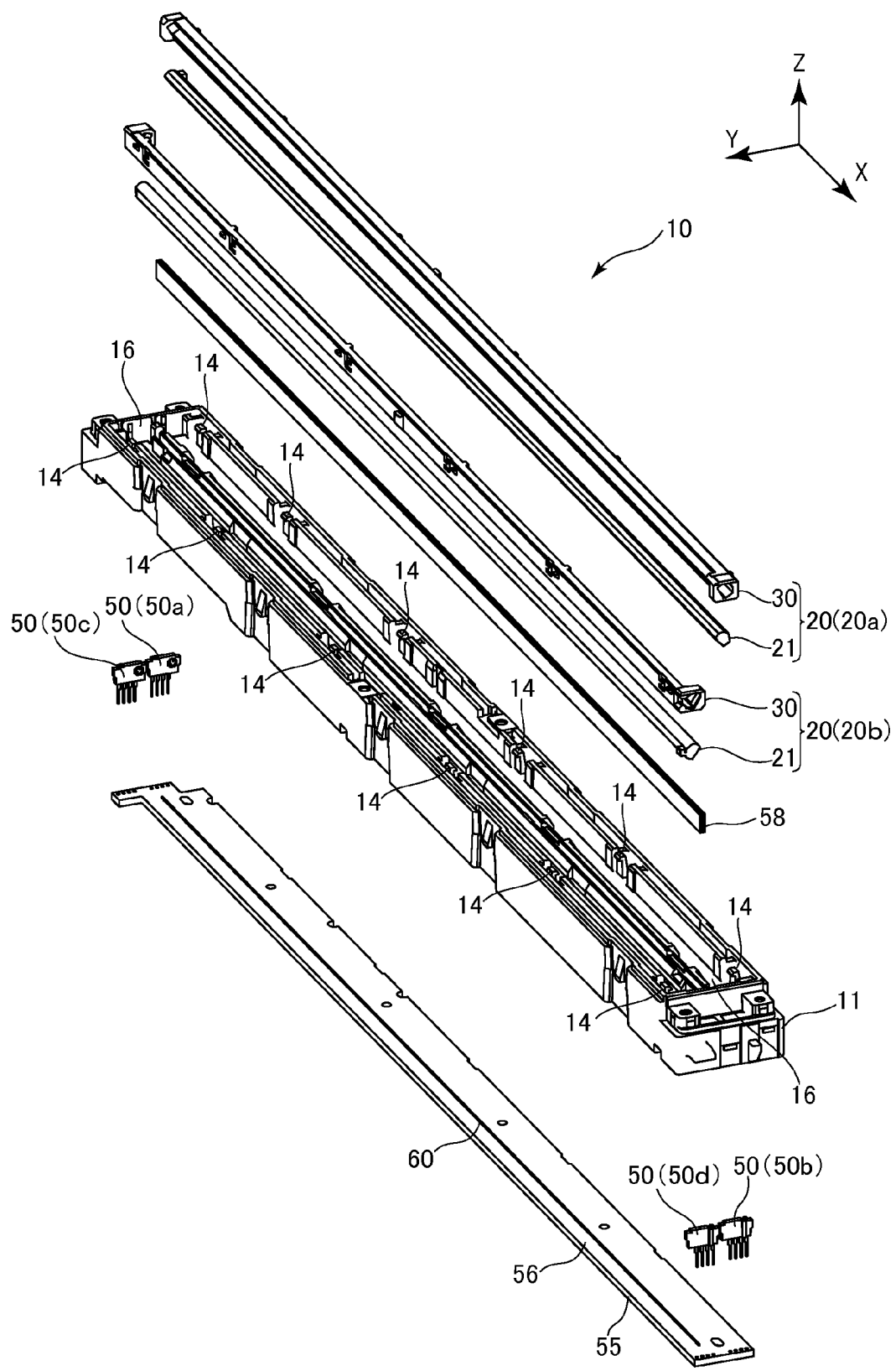
FIG. 5 is an exploded perspective view of the image sensor unit 10.
Figure 6:
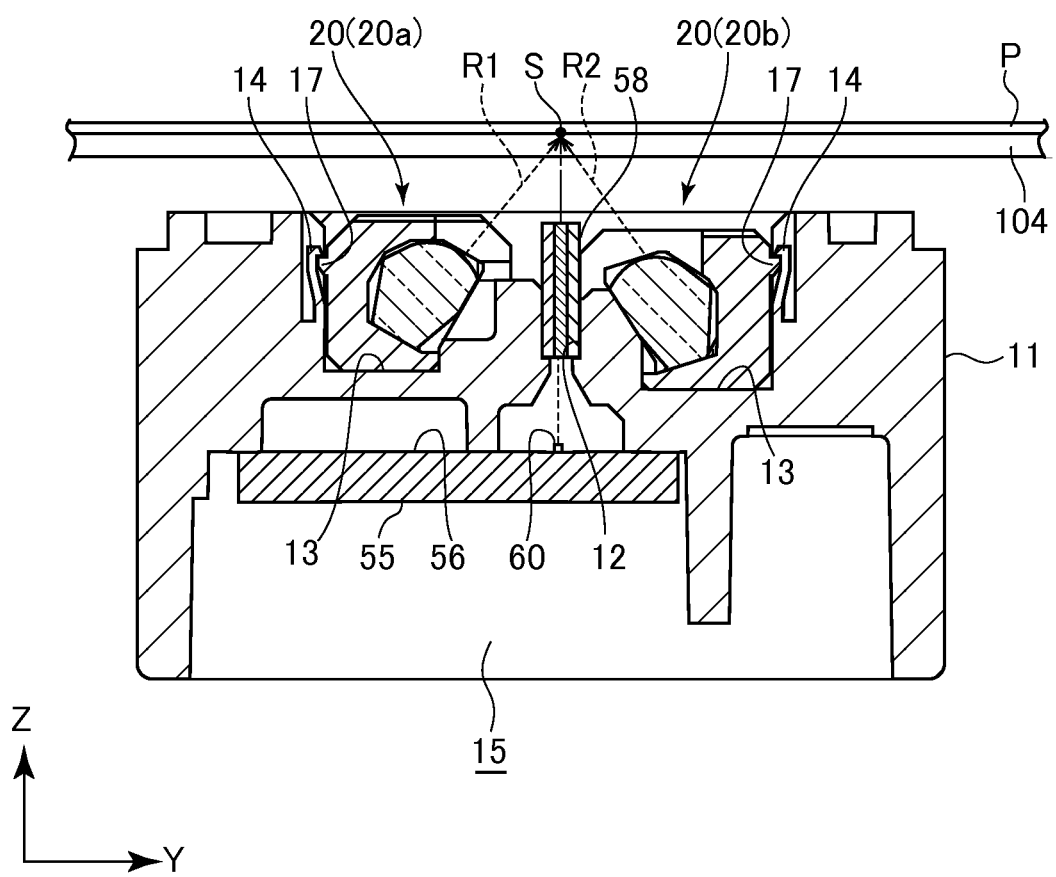
FIG. 6 is a sectional view of the image sensor unit 10.

The image sensor unit 10 of the present embodiment will be described with reference to the drawings. FIG. 4 is a perspective view of the image sensor unit 10. FIG. 5 is an exploded perspective view of the image sensor unit 10. FIG. 6 is a sectional view of the image sensor unit 10 cut in the sub-scan direction.

The image sensor unit 10 includes a frame 11, light guide portions 20, light sources 50, a substrate 55, a light condenser 58, an image sensor 60, and the like. The light guide portions 20 and the light sources 50 among the constituent members can function as illumination apparatuses. Among the constituent members, the frame 11, the light guide portions 20, the substrate 55, the light condenser 58, and the image sensor 60 are formed in length according to the dimension in the main-scan direction of the original P to be read.

The frame 11 is a housing member that houses the constituent members of the image sensor unit 10. The frame 11 is a substantially rectangular solid that is long in the main-scan direction and is formed to be able to position and support the constituent members inside. As illustrated in FIG. 6, a light condenser housing portion 12 that houses the light condenser 58 is formed in the main-scan direction, substantially at the center on the upper side of the frame 11. Light guide housing portions 13 that house the light guide portions 20 are formed on the frame 11 in the main-scan direction, on both sides across the light condenser housing portion 12. A plurality of engagement portions 14 for engagement with engagement protrusions 17 of a coupling portion 45 described later are formed at intervals in the main-scan direction in the light guide housing portions 13 (see FIG. 5). Substantially at the center of the frame 11, a substrate housing portion 15 for arranging the substrate 55 is formed in a concave shape from the lower side of the frame 11 in the main-scan direction. The substrate 55 housed in the substrate housing portion 15 is fixed by, for example, a fixing screw. Spaces 16 for arranging the light sources 50 are opened and formed in the vertical direction of the frame 11, on both ends of the frame 11 in the main-scan direction (see FIG. 5). The frame 11 is formed by, for example, a light-blocking resin material colored in black. The resin material can be, for example, polycarbonate.

The light guide portions 20 linearly guide the light emitted from the light sources 50 to the original P.

The image sensor unit 10 of the present embodiment includes two light guide portions 20 (first light guide portion 20a and second light guide portion 20b) and the light sources 50 are arranged on both ends of one light guide portion 20 in the longitudinal direction to increase the illuminance on the original P.

The first light guide portion 20a and the second light guide portion 20b have the same configuration and are arranged symmetrically about a point O where a center line c of the image sensor unit 10 illustrated in FIG. 4 and the light condenser 58 arranged in the main-scan direction intersect. The first light guide portion 20a will be mainly described here.

Figure 7:
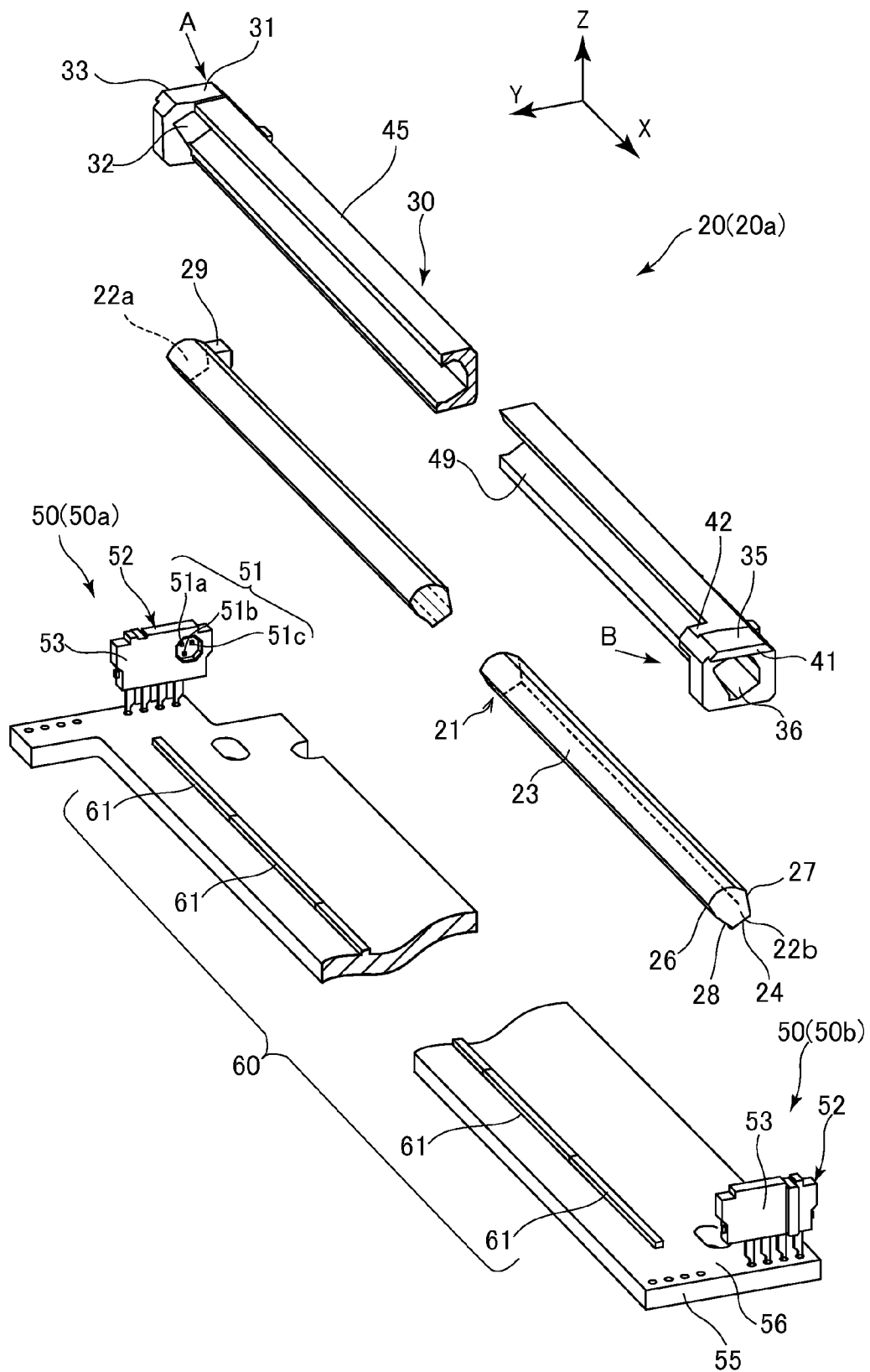
FIG. 7 is an exploded perspective view illustrating part of the image sensor unit 10.

FIG. 7 is a perspective view illustrating the first light guide portion 20a and the like in FIG. 6.

The light guide portion 20a includes a light guide member 21 and a light blocking member 30, and the light blocking member 30 holds the light guide member 21.

The light guide member 21 is formed by a transparent material, such as an acrylic resin, and is formed in a rod-like shape that is long in the main-scan direction.

The light guide member 21 is provided with an incident surface 22a for receiving light from a first light source 50a on one of both ends in the main-scan direction and is provided with an incident surface 22b for receiving light from a second light source 50b on the other end. The first incident surface 22a and the second incident surface 22b are orthogonal to the main-scan direction.

Figure 8:
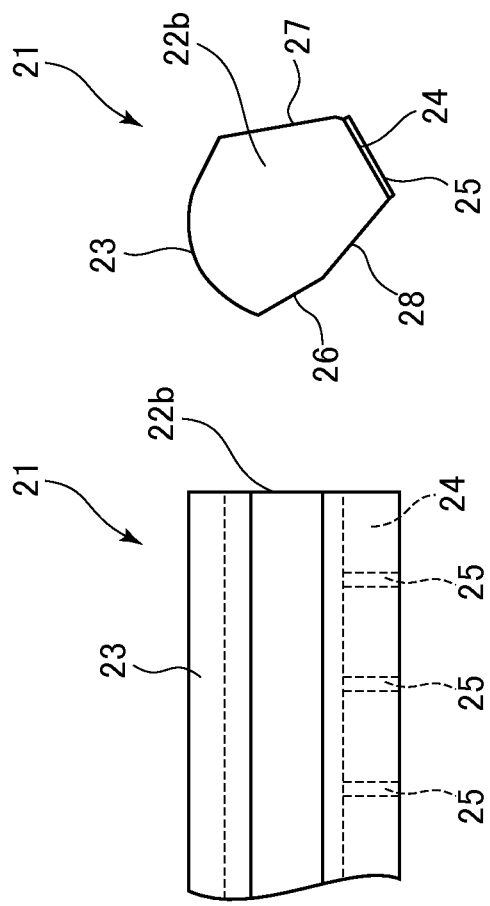
FIG. 8 is a view illustrating a shape of a light guide member 21.

FIG. 8 illustrates a sectional view, a front view, and a side view of the light guide member 21. On the surface facing the original P, the light guide member 21 is provided with an emission surface 23 for emitting light incident on the light guide member 21 toward the original P. The emission surface 23 has a convex arc shape on the upper side. On the surface facing the emission surface 23, the light guide member 21 is provided with a reflection surface 24 for reflecting light incident on the incident surfaces 22a and 22b and propagating the light in the longitudinal direction of the light guide member 21. A plurality of diffusing portions 25 are formed on the reflection surface 24 at intervals in the longitudinal direction. The diffusing portions 25 are formed in a prism shape and diffuse the light incident on the diffusing portions 25 toward the lower side of the reflection surface 24. The light diffused toward the lower side is reflected by a reflection surface 49 of the light blocking member 30 described later, and the light is emitted toward the upper side from the emission surface 23 of the light guide member 21.

The surfaces other than the emission surface 23 and the reflection surface 24 function as reflection surfaces for reflecting the incident light. More specifically, the light guide member 21 is provided with a reflection surface 26 adjacent to one side of the emission surface 23, a reflection surface 27 adjacent to the other side, and a reflection surface 28 positioned between the reflection surface 24 and the reflection surface 26.

As illustrated in FIG. 7, a locking claw 29 as a portion to be locked is integrated on one end of the light guide member 21. The locking claw 29 protrudes in a direction orthogonal to the longitudinal direction of the light guide member 21 from the reflection surface 27.

The light blocking member 30 is formed by, for example, polycarbonate, and is slightly longer than the light guide member 21 in the main-scan direction. The light blocking member 30 is colored in, for example, white to improve the reflectance of light.

The light blocking member 30 includes a first surrounding portion 31 formed on one end, a second surrounding portion 35 formed on the other end, and the coupling portion 45 connecting the first surrounding portion 31 and the second surrounding portion 35.

The outer shape of the first surrounding portion 31 viewed in the main-scan direction is substantially rectangular, and the first surrounding portion 31 is substantially cylindrical, with an insertion hole 32 penetrating in the main scan direction. The insertion hole 32 is larger than the cross-sectional shape of the light guide member 21, and the light guide member 21 can be inserted. In the state that the light guide member 21 is held by the light blocking member 30, one end of the light guide member 21 is positioned in the insertion hole 32 and is covered by the first surrounding portion 31.

Figure 9:
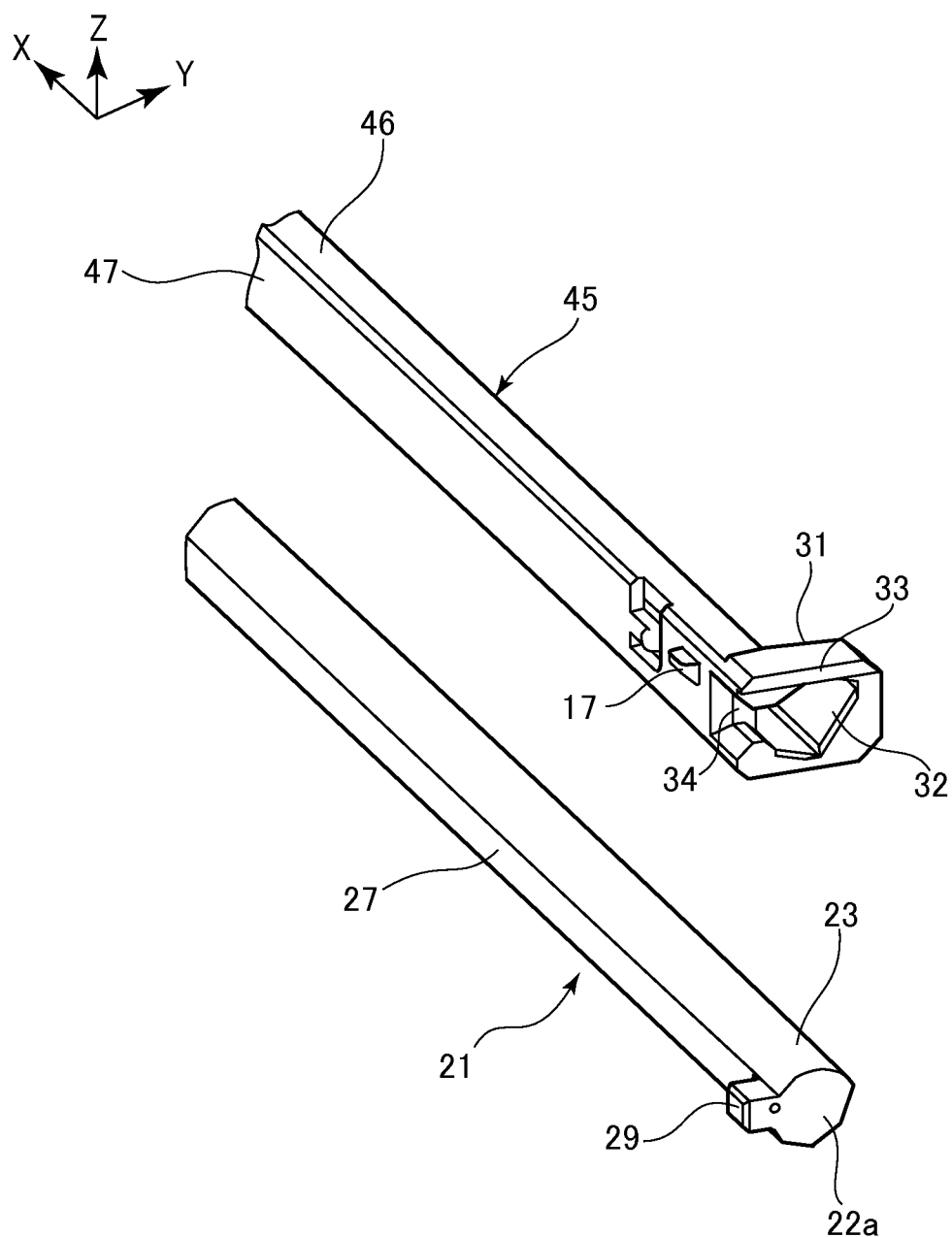
FIG. 9 is an exploded perspective view of the light guide portion 20a viewed from one side.

FIG. 9 is a perspective view of the first surrounding portion 31 viewed from an arrow A direction illustrated in FIG. 7. As illustrated in FIG. 9, the first surrounding portion 31 is provided with an eave portion 33 protruding in the main-scan direction from an end face of an upper portion. The first surrounding portion 31 is also provided with a concave locking portion 34 to be locked with the locking claw 29 of the light guide member 21. The locking portion 34 is continuous with the end face of the first surrounding portion 31 and is formed in a concave shape in the main-scan direction, at a position adjacent to the insertion hole 32. The locking portion 34 is formed in the insertion direction of the light guide member 21 as described later when the light blocking member 30 holds the light guide member 21.

The outer shape of the second surrounding portion 35 viewed in the main-scan direction is substantially rectangular, and the second surrounding portion 35 is substantially cylindrical, with an insertion hole 36 penetrating in the main scan direction. The insertion hole 36 is larger than the cross-sectional shape of the light guide member 21, and the light guide member 21 can be inserted. In the state that the light guide member 21 is held by the light blocking member 30, another end of the light guide member 21 is positioned in the insertion hole 36 and is covered by the second surrounding portion 35.

Figure 10:
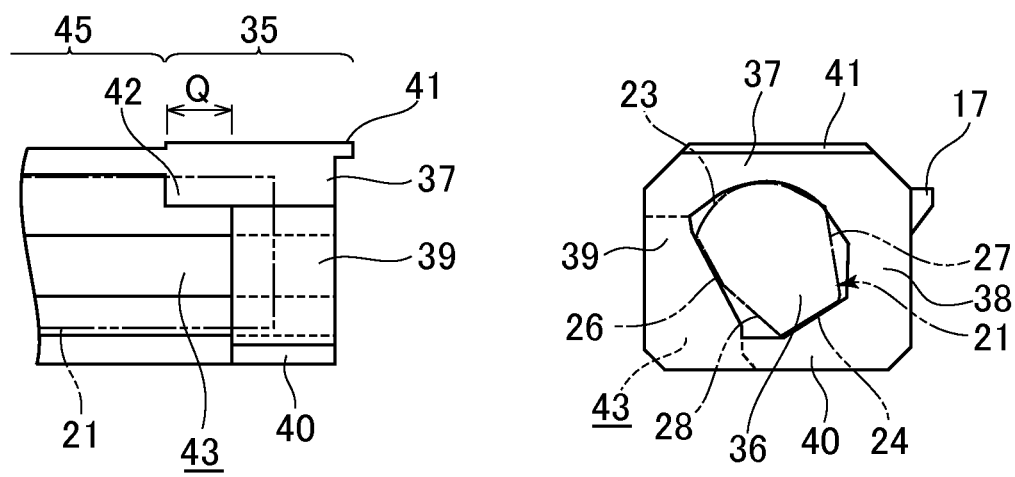
FIG. 10 is a view illustrating a shape of a second surrounding portion 35.

FIG. 10 illustrates a front view and a side view of the second surrounding portion 35. In FIG. 10, an alternate long and two short dashes line indicates the light guide member 21. An upper portion 37 of the second surrounding portion 35 covers the light guide member 21 from the upper side. A side portion 38 and a side portion 39 cover the reflection surface 26 and the reflection surface 27 of the light guide member 21 from the side. A lower portion 40 covers the reflection surface 24 and the reflection surface 28 of the light guide member 21 from the lower side.

The second surrounding portion 35 is provided with an eave portion 41 protruding in the main-scan direction from an end face of the upper portion 37. The eave portion 41 has the same shape as the eave portion 33 of the first surrounding portion 31. The second surrounding portion 35 includes a light blocking portion 42 protruding toward the first surrounding portion 31 from the upper portion 37. The light blocking portion 42 can cover the emission surface 23 of the light guide member 21 from the upper side to block the leak light.

A cut-out portion 43 formed by cutting out the side portion 39 of the second surrounding portion 35 is formed adjacent to the light blocking portion 42 in an area provided with the light blocking portion 42 (Q in FIG. 10). Therefore, part of the reflection surface 26 and the reflection surface 28 of the light guide member 21 is exposed in the area provided with the light blocking portion 42.

The coupling portion 45 has a substantially U-shaped cross section and has substantially the same length as the light guide member 21 in the main-scan direction. Specifically, the coupling portion 45 has a cross-sectional shape with an opening on the side provided with the light condenser 58 of the second surrounding portion 35. The coupling portion 45 covers substantially half of the light guide member 21 in the state that the light guide member 21 is held by the light blocking member 30.

Figure 11:
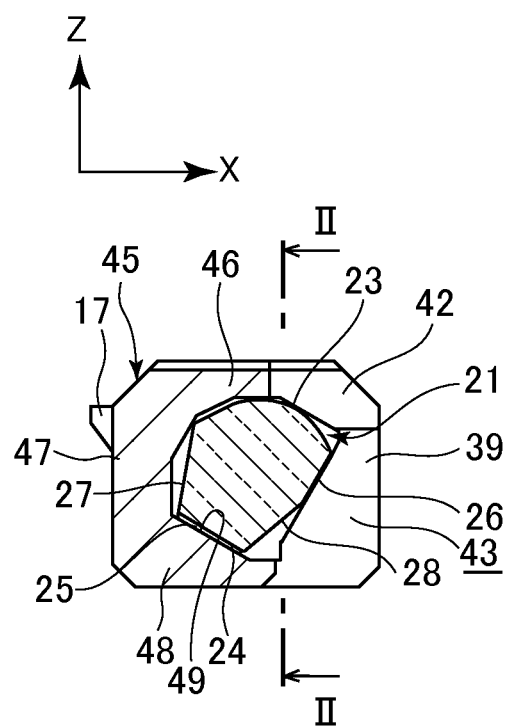
FIG. 11 is an enlarged view of the light guide portion 20a illustrated in FIG. 6.

FIG. 11 is an enlarged view of the light guide portion 20a illustrated in FIG. 6. As illustrated in FIG. 11, the coupling portion 45 has a shape in which the light blocking portion 42 and the side portion 39 of the second surrounding portion 35 are omitted. An upper portion 46 of the coupling portion 45 covers part of the emission surface 23 of the light guide member 21 from the upper side to regulate the direction of light emitted to the original P. A side portion 47 covers the reflection surface 27 of the light guide member 21 from the side. A lower portion 48 covers the reflection surface 24 of the light guide member 21 from the lower side.

A reflection surface 49 inclined downward in the direction of the opening with a substantially U-shaped cross section is formed on part of the inner surface of the lower portion 48. The reflection surface 49 reflects the light diffused downward by the diffusing portion 25 of the light guide member 21 toward the emission surface 23 of the light guide member 21. The inner surface of the upper portion 46 of the coupling portion 45 and the inner surface of the side portion 47 also have a function of reflecting light.

The engagement protrusions 17 as a plurality of portions to be engaged are formed on the outer surface of the side portion 47, at intervals in the longitudinal direction. The engagement protrusions are engaged with the engagement portions 14 of the frame 11, and the light blocking member 30 is held in the frame 11.

When the light guide member 21 is held by the light blocking member 30, the other end of the light guide member 21 is inserted to the insertion hole 32 of the first surrounding portion 31 of the light blocking member 30 and is then inserted to the insertion hole 36 of the second surrounding portion 35 of the light blocking member 30 from the inside of the coupling portion 45. The light guide member 21 is inserted until the locking claw 29 of the light guide member 21 is locked with the locking portion 34 of the first surrounding portion 31 of the light blocking member 30, and the light guide member 21 is held by the light blocking member 30. In this way, the locking portion 34 is formed in the insertion direction of the light guide member 21.

The light source 50 emits light to direct the light to the original P through the light guide portion 20. An LED module 52 including an LED chip 51 is used as the light source 50. In the present embodiment, the first light source 50a and the second light source 50b are arranged on both ends of the first light guide portion 20a in the longitudinal direction, and a third light source 50c and a fourth light source 50d are arranged on both ends of the second light guide portion 20b in the longitudinal direction. The first to fourth light sources 50a to 50d have the same configuration, and the first light source 50a and the second light source 50b arranged on both ends of the first light guide portion 20a will be mainly described.

As illustrated in FIG. 7, the LED module 52 as the light source 50 is a so-called surface-mount LED module including the LED chip 51 on the surface. The LED module 52 includes a housing 53 that is a substantially rectangular solid. The LED chip 51 as a light emission portion formed in a concave shape is arranged on part of the surface of the housing 53. A plurality of (for example, three) LED chips 51 (51a, 51b, and 51c) are arranged here, sealed by a transparent resin. The LED chips 51a, 51b, and 51c can be, for example, LED chips with emission wavelengths of red, green, and blue.

The substrate 55 is formed in a planar shape that is long in the main-scan direction. A mounting surface 56 of the substrate 55 is orthogonal to the vertical direction. A drive circuit and the like for the LED module 52 to emit light are mounted on the mounting surface 56 of the substrate 55.

The light condenser 58 is an optical member that focuses the reflected light from the original P on the image sensor 60. The light condenser 58 can be, for example, a rod-lens array including a plurality of imaging elements (rod lenses) of an erect equal magnification imaging type linearly arranged in the main-scan direction. The light condenser 58 is inserted to the light condenser housing portion 12 of the frame 11 from the upper side and is held in the light guide housing portion 13. The light condenser 58 is not limited to the configuration as long as the light condenser 58 can form an image on the image sensor 60. The light condenser 58 can be various conventionally well-known optical members with light condensing functions, such as various microlens arrays.

The image sensor 60 is mounted on the substrate 55 and arranged on the lower side of the light condenser 58. As illustrated in FIG. 7, the image sensor 60 includes a predetermined number of image sensor ICs 61 made of a plurality of light receiving elements (light receiving elements may also be called photoelectric conversion elements) according to the resolution of reading by the image sensor unit 10, and the image sensor ICs 61 are linearly arranged in the main-scan direction on the mounting surface 56 of the substrate 55. The image sensor 60 receives the reflected light reflected from the original P and focused by the light condenser 58 and converts the reflected light to an electric signal. The image sensor 60 is not limited to the configuration as long as the image sensor 60 can convert the reflected light reflected from the original P to an electric signal. The image sensor ICs 61 can be various conventionally well-known image sensor ICs.

A method of assembling the image sensor unit 10 configured as described above will be described. First, the LED modules 52 as the first to fourth light sources 50a to 50d are mounted on both ends in the longitudinal direction of the substrate 55 provided in advance with the image sensor 60.

Next, the substrate 55 provided with the LED modules 52 is inserted to the substrate housing portion 15 from the lower side of the frame 11 and is fixed by, for example, a fixing screw. In this case, the LED modules 52 are arranged in the space 16 of the frame 11. Next, the light condenser 58 is inserted to the light condenser housing portion 12 from the upper side of the frame 11 and is fixed by, for example, an adhesive. The first light guide portion 20a and the second light guide portion 20b are inserted to the light guide housing portions 13 from the upper side of the frame 11. The engagement portions 14 formed on the light guide housing portions 13 of the frame 11 are engaged with the engagement protrusions 17 formed on the coupling portions 45 of the light guide portions 20a and 20b, and the light guide portion 20a and the light guide portion 20b are held by the frame 11. In this case, the eave portion 33 of the first surrounding portion 31 and the eave portion 41 of the second surrounding portion 35 are placed on the upper part of the housing 53 of an LED module 52b.

Figure 1:
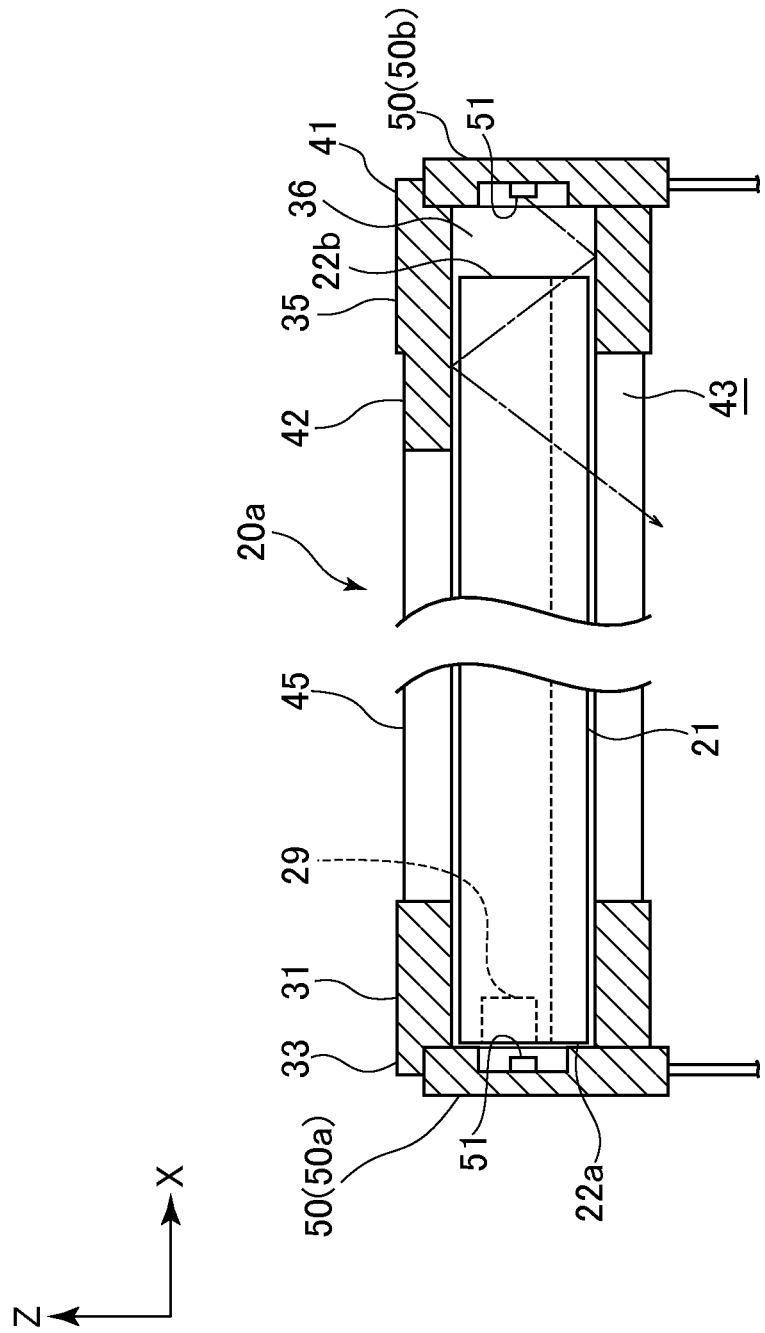
FIG. 1 is a sectional view illustrating a state that a light guide portion 20a is held by a frame 11.

FIG. 1 is a sectional view of a II-II line illustrated in FIG. 4 (see also II-II line illustrated in FIG. 11), indicating a state that the light guide portion 20a is held by the frame 11.

As illustrated in FIG. 1, the LED chip 51 of the first light source 50a faces the incident surface 22a of the light guide member 21, and the LED chip 51 of the second light source 50b faces the incident surface 22b of the light guide member 21 in the state that the light guide portion 20a is held by the frame 11. The first surrounding portion 31 covers one end of the light guide member 21, and the second surrounding portion 35 covers the other end of the light guide member 21.

In the image sensor unit 10 configured as described above, the light sources 50 emit light, and as illustrated in FIG. 6, the light is emitted from the first light guide portion 20a and the second light guide portion 20b to the lower surface of the original P as indicated by arrows R1 and R2. Therefore, the light is linearly emitted to the original P, throughout a reading line S (main-scan direction). The light is reflected by the original P, and the reflected light is focused on the image sensor 60 through the light condenser 58. The image sensor 60 can convert the focused reflected light to an electric signal to read the image on the lower surface of the original P.

The image sensor 60 reads the reflected light of one scan line, and the reading operation of one scan line in the main-scan direction of the original P is completed. After the completion of the reading operation of one scan line, reading operation of the next one scan line is performed in the same way as the operation described above, along with relative movement of the original P in the sub-scan direction. In this way, the image sensor unit 10 repeats the reading operation of one scan line while moving in the sub-scan direction to thereby successively scan the entire surface of the original P to read the image based on the reflected light.

The temperature of the image sensor unit 10 configured as described above is high during the reading operation, and the image sensor unit 10 is cooled to near the room temperature when the reading operation is stopped. In this case, the light guide member 21 is formed by a material different from the frame 11 or the light blocking member 30, and the expansion and contraction ratio is different from that of the frame 11 or the light blocking member 30. Specifically, the expansion and contraction ratio of the light guide member 21 is greater than that of the frame 11 or the light blocking member 30, and the light guide member 21 expands in the longitudinal direction with an increase in the temperature and contracts in the longitudinal direction with a decrease in the temperature.

One end of the light guide member 21 is locked with the light blocking member 30 by the locking claw 29, and the end is a fixed end. Therefore, the gap between the first light source 50a and the incident surface 22a is substantially constant regardless of the temperature. On the other hand, the other end of the light guide member 21 is not locked with the light blocking member 30, and the end is a free end. Therefore, the gap between the second light source 50b and the incident surface 22b varies with an expansion or contraction of the light guide member 21.

Particularly, the inner surface of the insertion hole 36 of the second surrounding portion 35 is exposed when the gap between the second light source 50b and the incident surface 22b increases with a contraction of the light guide member 21. Therefore, conventionally, the amount of light emitted from the second light source 50b and directly reflected by the inner surface of the insertion hole 36 increases, and the reflected light is emitted toward the original P from the emission surface 23 of the light guide member 21, resulting in a large amount of leak light. Therefore, the leak light varies in response to the expansion or contraction of the light guide member 21 due to the ambient temperature, and making the illuminance on the original P emitted from the light guide member 21 uniform is difficult.

In the present embodiment, the light blocking portion 42 protruding toward the first surrounding portion 31 from the upper portion 37 of the second surrounding portion 35 is formed, and the light blocking portion 42 blocks the light reflected by the inner surface of the insertion hole 36. This can prevent the emission of light toward the original P. The light blocked by the light blocking portion 42 is reflected by the light blocking portion 42, and as illustrated in FIG. 1, part of the light reflected by the light blocking portion 42 passes inside of the light guide member 21 and is emitted to the lower side of the light guide portion 20a through the cut-out portion 43. More specifically, the light emitted to the lower side of the light guide portion 20a is reduced by the frame 11, and the generation of leak light can be prevented. Therefore, the illuminance on the original P can be made uniform even if the light guide member 21 is expanded or contracted.

The illuminance of light with the use of a light blocking member not provided with a light blocking portion will be analyzed in a comparative example, and the illuminance of light with the use of the light blocking member 30 provided with the light blocking portion 42 of the present embodiment will be analyzed in an example.

COMPARATIVE EXAMPLE

Figure 12A:
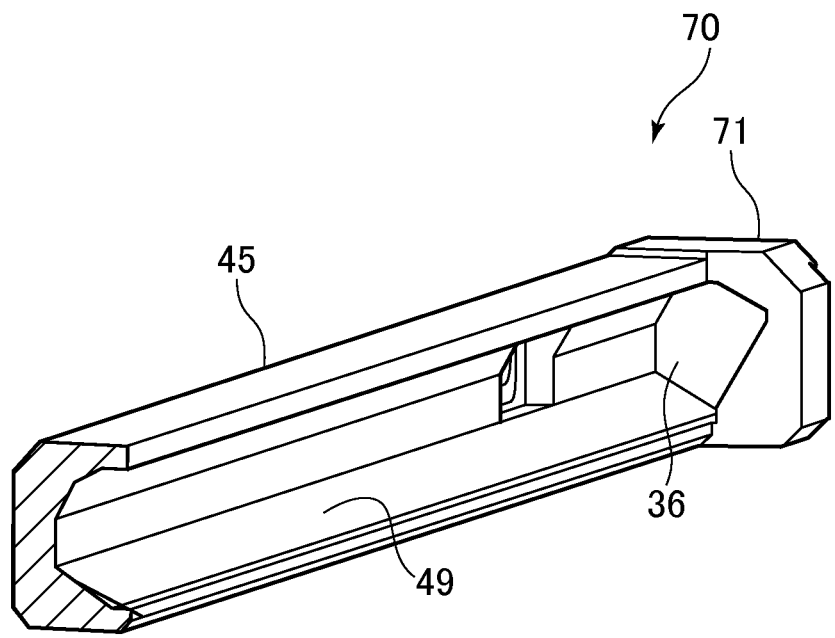
FIG. 12A is a perspective view illustrating a light blocking member 70 of a comparative example.

FIG. 12A is a perspective view of a light blocking member 70 of the comparative example. As illustrated in FIG. 12A, a surrounding portion (second surrounding portion) 71 of the light blocking member 70 has the same shape as that of the example, except that the light blocking portion of the present embodiment is not formed. The same reference numerals are provided, and the description will not be repeated.

Figure 13A:
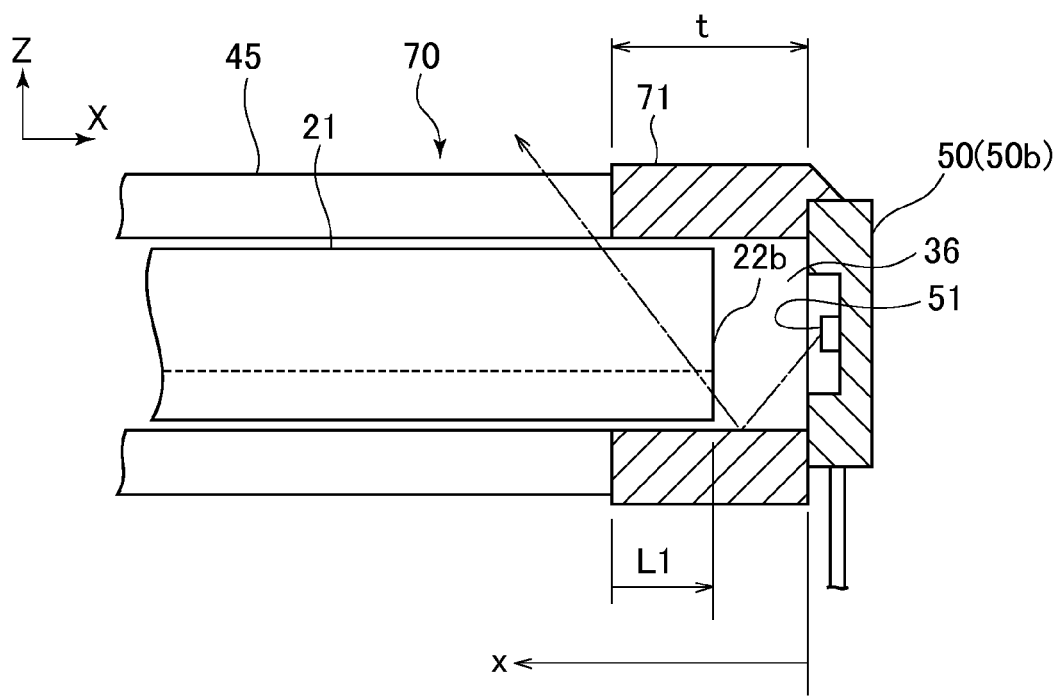
FIG. 13A is a sectional view illustrating a relationship between the light blocking member 70 and the light guide member 21 of the comparative example.

FIG. 13A is a sectional view illustrating a relationship between the surrounding portion 71 of the light blocking member 70 and the light guide member 21 in the comparative example. Here, a dimension t in the main-scan direction of the surrounding portion 71 of the light blocking member 70 in the comparative example is 3 mm. The illuminance of the reading line S from the second light source 50b according to the main-scan direction (x direction) is measured when a distance L1 of the light guide member 21 from an end on one side of the surrounding portion 71 is changed.

Figure 14A:
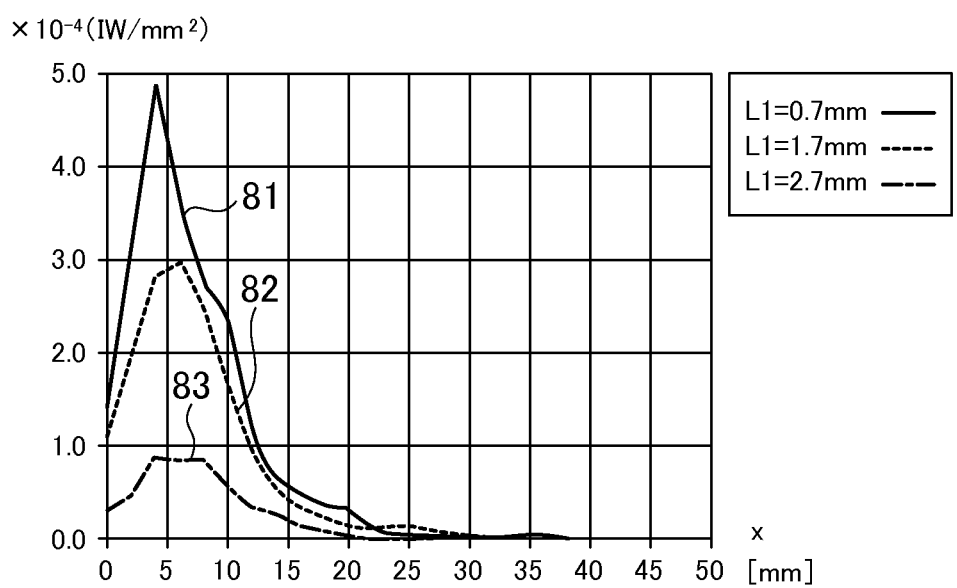
FIG. 14A is a graph illustrating a result of illuminance measured when the light blocking member 70 of the comparative example is used.

FIG. 14A is a graph illustrating results of measured illuminance. The vertical axis indicates illuminance [$W/mm^2$], and the horizontal axis indicates distance x [mm] from the light source 50b. In FIG. 14A, a characteristic line 81 illustrated by a solid line indicates an illuminance change when L1 is 0.7 mm, a characteristic line 82 illustrated by a dashed line indicates an illuminance change when L1 is 1.7 mm, and a characteristic line 83 illustrated by an alternate long and short dash line indicates an illuminance change when L1 is 2.7 mm. As illustrated in FIG. 14A, the leak light increases with an increase in the gap between the incident surface 22b of the light guide member 21 and the second light source 50b when the light blocking portion is not formed, and the illuminance cannot be made uniform.

EXAMPLE

Figure 12B:
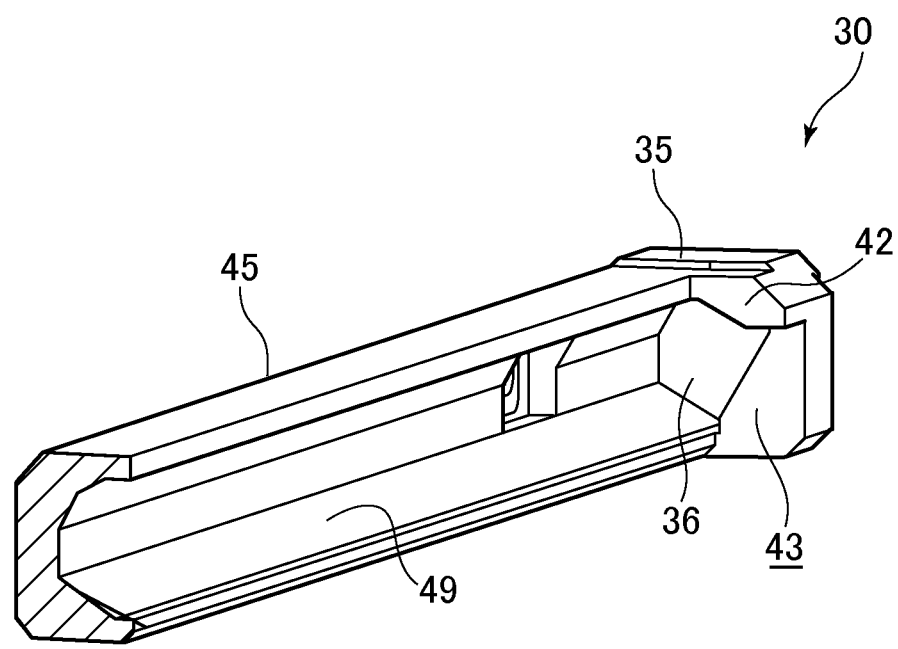
FIG. 12B is a perspective view illustrating a light blocking member 30 of an example.

FIG. 12B is a perspective view of the light blocking member 30 of the example and is equivalent to a view from the arrow B direction illustrated in FIG. 7. The light blocking member 30 has the same shape as that of the embodiment. The same reference numerals are provided, and the description will not be repeated.

Figure 13B:
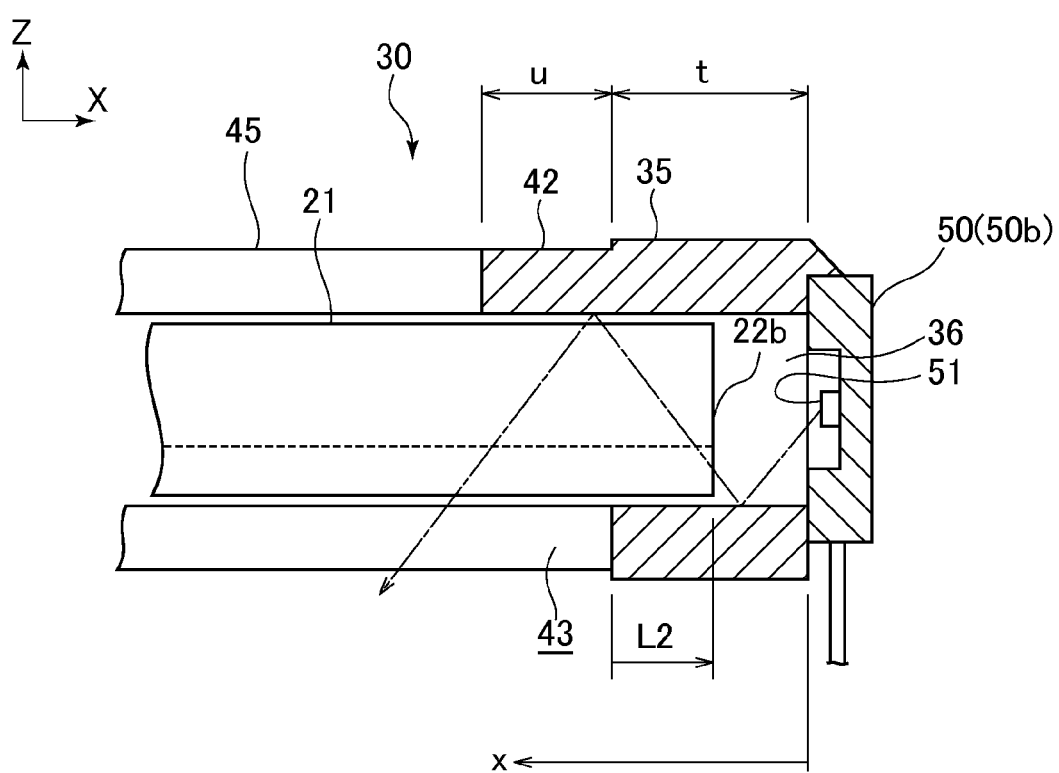
FIG. 13B is a sectional view illustrating a relationship between the light blocking member 30 and the light guide member 21 of the example.

FIG. 13B is a sectional view illustrating a relationship between the second surrounding portion of the light blocking member 30 and the light guide member 21 in the example. Here, the dimension t in the main-scan direction excluding the light blocking portion 42 of the second surrounding portion of the light blocking member 30 in the example is 3 mm, and a dimension u in the main-scan direction of the light blocking portion 42 is 2 mm. The illuminance of the reading line S from the second light source 50b according to the main-scan direction (x direction) is measured when a distance L2 of the light guide member 21 from an end on one side of the second surrounding portion 35 is changed.

Figure 14B:
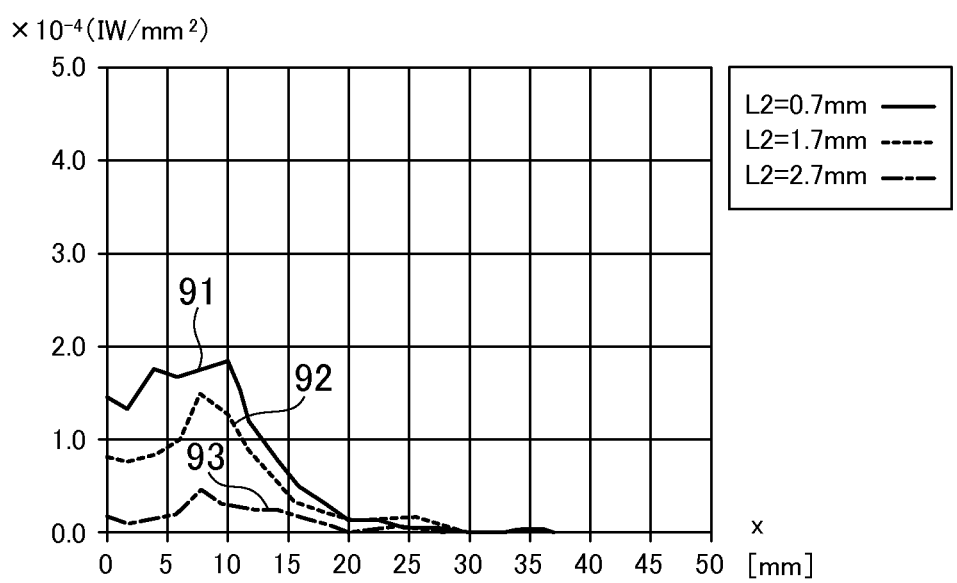
FIG. 14B is a graph illustrating a result of illuminance measured when the light blocking member 30 of the example is used.

FIG. 14B is a graph illustrating results of measured illuminance. The vertical axis indicates illuminance [$W/mm^2$], and the horizontal axis indicates distance x [mm] from the light source 50. In FIG. 14B, a characteristic line 91 illustrated by a solid line indicates an illuminance change when L2 is 0.7 mm, a characteristic line 92 illustrated by a dashed line indicates an illuminance change when L2 is 1.7 mm, and a characteristic line 93 illustrated by an alternate long and short dash line indicates an illuminance change when L2 is 2.7 mm.

As illustrated in FIG. 14B, when the light blocking portion 42 is formed, the leak light is not greater than in the comparative example even when the gap between the incident surface 22*b* of the light guide member 21 and the second light source 50*b* is large, and the illuminance can be made uniform.

According to the present embodiment, the second surrounding portion 35 includes: the light blocking portion 42 protruding toward one end of the light guide member 21 and covering the emission surface 23 of the light guide member 21; and the cut-out portion adjacent to the light blocking portion 42 and exposing part of the reflection surfaces of the light guide member 21, or specifically, the reflection surface 26. According to the configuration, the light blocking portion 42 can block the light reflected by the inner surface of the insertion hole of the second surrounding portion 35 to prevent the direct emission of the light from the second light source 50*b* to the original P, particularly when the gap between the second light source 50*b* and the incident surface 22*b* increases with a contraction of the light guide member 21. The light blocked by the light blocking portion 42 is reflected by the light blocking portion 42, and part of the light can be released through the cut-out portion 43 to prevent the emission of light to the original P again. Therefore, the illuminance on the original P emitted from the light guide member 21 can be made uniform even if the light guide member 21 is expanded or contracted due to the ambient temperature.

In the present embodiment, the cut-out portion 43 exposes the reflection surface 26 adjacent to the emission surface 23. If the cut-out portion 43 exposes the reflection surface 24 facing the emission surface 23 of the reflection surfaces of the light guide member 21, a large amount of light is released through the cut-out portion 43, and the amount of light emitted from the light guide member 21 may be reduced. Therefore, the cut-out portion 43 exposes the reflection surface 26 adjacent to the emission surface 23 to moderately release the light reflected by the light blocking portion 42 to prevent the reduction in the amount of light emitted from the light guide member 21.

In the present embodiment, the locking portion 34 locked with the locking claw 29 formed on one end of the light guide member 21 and the coupling portion 45 covering the reflection surface 24 facing the emission surface 23 of the light guide member 21 are integrated and formed on the light blocking member 30. Therefore, just by assembling the light guide member and the light blocking member 30, one end of the light guide member 21 can be locked so that the end becomes a fixed end, and the second surrounding portion 35 can slidably cover the other end of the light guide member 21 so that the end becomes a free end.

In the present embodiment, the light guide member 21 is held by the frame 11 through the light blocking member 30. Therefore, the light guide member 21 and the light blocking member 30 do not have to be separately assembled in the narrow space of the frame 11, and the assembly is easy.

(Second Embodiment)

A light blocking member of a second embodiment will be described with reference to FIG. 15. The same configurations as in the first embodiment are designated with the same reference numerals, and the description will not be repeated.

Figure 15:
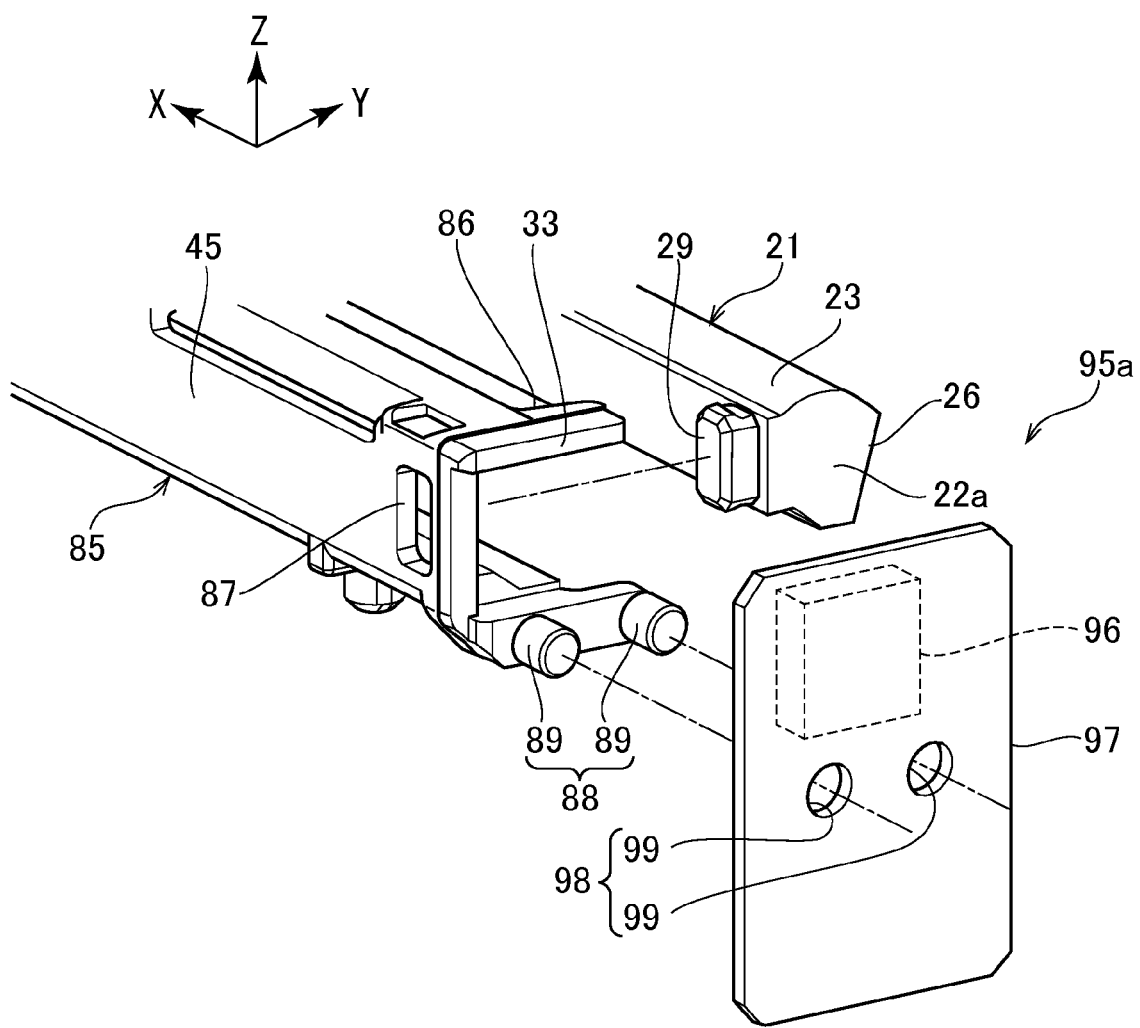
FIG. 15 is a perspective view illustrating a configuration around a light blocking member 85 of a second embodiment.

FIG. 15 is a perspective view illustrating a configuration of the light blocking member of the present embodiment.

In a light blocking member 85 of the present embodiment, a first surrounding portion 86 has a substantially U-shaped cross section, and the light blocking member 85 has a cross-sectional shape with an opening on the side provided with the light condenser 58, as in the coupling portion 45. Therefore, only part of one end of the light guide member 21 is covered by the first surrounding portion 86 in a state that the light guide member 21 is held by the light blocking member 85. Specifically, part of the emission surface 23 and the reflection surface 26 adjacent to the emission surface 23 of one end of the light guide member 21 are exposed.

A locking portion 87 for engagement with the locking claw 29 of the light guide member 21 is formed on the first surrounding portion 86. The locking portion 87 of the present embodiment is a hole positioned away from the main-scan direction from the end face of the first surrounding portion 86 and formed in the direction orthogonal to the main-scan direction.

Meanwhile, the second surrounding portion 35 of the light blocking member 85 is provided with the insertion hole 36 as in the first embodiment. Therefore, when the light guide member 21 is held by the light blocking member 85, the other end of the light guide member 21 is inserted not to the first surrounding portion 86, but directly to the insertion hole 36 of the second surrounding portion 35, unlike in the first embodiment. The light guide member 21 is then inserted and fitted to the light blocking member 85 from the direction orthogonal to the main-scan direction. In this case, the locking claw 29 of the light guide member 21 is inserted along the hole of the locking portion 87 of the first surrounding portion 86 from the direction orthogonal to the main-scan direction, and the light guide member 21 is held by the light blocking member 85.

In this way, the first surrounding portion 86 of the light blocking member 85 is opened in the direction orthogonal to the main-scan direction. It is only necessary to insert the other end of the light guide member 21 to the insertion hole 36 of the second surrounding portion 35, and the light guide portion 20 can be easily assembled. The assembly is possible by inserting the other end of the light guide member 21 only to the insertion hole 36 of the second surrounding portion 35. The length that the light guide member 21 and the insertion hole 36 make contact can be reduced when the light guide member 21 is inserted to the insertion hole 36, and this can prevent damaging the light guide member 21.

The locking portion 87 formed on the first surrounding portion 86 is a hole along the insertion direction when the light guide member 21 is fitted to the light blocking member 85 from the direction orthogonal to the main-scan direction. The hole can lock one end of the light guide member 21 so that the end becomes a fixed end, just by fitting the light guide member 21 in the light blocking member 85. Since the locking portion 87 is a hole formed in the direction orthogonal to the main-scan direction, the positioning accuracy of the light guide member 21 in the main-scan direction can be improved by locking the locking claw 29 of the light guide member 21 with the locking portion 87.

The first surrounding portion 86 of the present embodiment includes a positioning portion 88 integrated on the end face. The positioning portion 88 is, for example, a plurality of (two) columnar protrusions 89 projecting in the main-scan direction from the end face of the first surrounding portion 86. The positioning portion 88 is engaged with a positioned portion 98 of a circuit board 97 of a first light source 95*a* described later.

The first light source 95*a* includes a top-view surface-mount LED package 96 provided with the LED chips 51, and the LED package 96 is mounted on a circuit board 97. The circuit board 97 is provided with a positioned portion 98. The positioned portion 98 is, for example, a plurality of (two) insertion holes 99. Therefore, the positioning portion 88 of the first surrounding portion 86 is engaged with the positioned portion 98 of the circuit board 97, and the light guide member 21 and the first light source 95*a* are positioned through the light blocking member 85. The protrusions 89 of the positioning portion 88 can be inserted to the insertion holes 99 of the positioned portion 98, and heat caulking can be applied to the tips of the protrusions 89 exposed from the circuit board 97 to couple the light blocking member 85 with the circuit board 97. A circuit pattern for electrically connecting the substrate 55 and the LED package 96 is formed on the circuit board 97, and the circuit board 97 is connected to the substrate 55 to feed power from the substrate 55 to the LED package 96.

The positioning portion 88 may also be formed on the second surrounding portion 35, and a second light source 95b arranged on the other end of the light guide portion 20 may have the same configuration as the first light source 95a.

Although the present invention has been described along with the embodiments, the present invention is not limited only to the embodiments. Changes and the like can be made within the scope of the present invention, and the embodiments may be appropriately combined.

For example, although the diffusing portions 25 are formed on the reflection surface 24 of the light guide member 21 in the description of the first embodiment, the arrangement is not limited to this. For example, a light diffusing pattern made of a light reflective paint created by silk screen printing or the like may be formed on the reflection surface 24. The light diffusing pattern diffuses the light incident on the incident surface 22, and the light is emitted from the emission surface 23 and directed to the original P. In this case, the coupling portion 45 of the light blocking member 30 can be omitted, and the first surrounding portion 31 and the second surrounding portion 35 can be separately formed.

Although the image sensor unit 10 including the first light guide portion 20a and the second light guide portion 20b arranged on both sides of the light condenser 58 has been described in the first embodiment, the arrangement is not limited to this, and only one of the first light guide portion 20a and the second light guide portion 20b may be included.

A planar cover glass may be arranged to cover the upper direction of the frame 11 in the first embodiment. The arrangement of the cover glass can prevent dust from entering the frame 11. The cover glass is not limited to glass, and for example, a member provided with a hard coat as necessary on the surface of a transparent resin material, such as acrylic and polycarbonate resin materials, can be applied.

According to the present invention, the illuminance on the illuminated body can be made uniform even if the light guide member is expanded or contracted.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An illumination apparatus that linearly illuminates an illuminated body, the illumination apparatus comprising:
    a first light source;
    a second light source;
    a rod-like light guide member, wherein the first light source is arranged on one end in a longitudinal direction, the second light source is arranged on another end in the longitudinal direction, light emitted from the first light source and the second light source is propagated by a reflection surface and emitted to the illuminated body from an emission surface, the one end is a fixed end, and the other end is a free end; and
    a light blocking member comprising a surrounding portion slidably covering the other end of the light guide member, wherein
    the surrounding portion comprises: a light blocking portion protruding toward the one end of the light guide member and covering the emission surface of the light guide member; and a cut-out portion adjacent to the light blocking portion and exposing part of the reflection surface of the light guide member,
    part of light reflected by the light blocking portion passes the cut-out portion, and
    a locking portion locked with a portion to be locked formed on the one end of the light guide member and a coupling portion covering a reflection surface facing the emission surface of the light guide member are integrated in the light blocking member.

2. The illumination apparatus according to claim 1, wherein
    the cut-out portion exposes a reflection surface adjacent to the emission surface.

3. The illumination apparatus according to claim 1, wherein
    the locking portion is formed in an insertion direction of the light guide member to the light blocking member.

4. The illumination apparatus according to claim 3, wherein
    the locking portion is continuously formed from one end of the light blocking member in the longitudinal direction.

5. The illumination apparatus according to claim 4, wherein
    the locking portion is a hole formed in the insertion direction of the light guide member to the light blocking member.

6. The illumination apparatus according to claim 1, further comprising
    a housing member that houses a substrate provided with the first light source and the second light source, the light guide member, and the light blocking member, wherein
    the light guide member is held in the housing member through the light blocking member.

7. The illumination apparatus according to claim 1, wherein
    an incident surface that receives the light emitted from the second light source arranged on the other end of the light guide member is arranged between the cut-out portion and the second light source.

8. An image sensor unit comprising:
    an illumination apparatus that linearly illuminates an illuminated body, the illumination apparatus comprising:
        a first light source;
        a second light source;
        a rod-like light guide member, wherein the first light source is arranged on one end in a longitudinal direction, the second light source is arranged on another end in the longitudinal direction, light emitted from the first light source and the second light source is propagated by a reflection surface and emitted to the illuminated body from an emission surface, the one end is a fixed end, and the other end is a free end; and
        a light blocking member comprising a surrounding portion slidably covering the other end of the light guide member, wherein
        the surrounding portion comprises: a light blocking portion protruding toward the one end of the light guide member and covering the emission surface of the light guide member; and a cut-out portion adjacent to the light blocking portion and exposing part of the reflection surface of the light guide member,
part of light reflected by the light blocking portion passes the cut-out portion, and
a locking portion locked with a portion to be locked formed on the one end of the light guide member and a coupling portion covering a reflection surface facing the emission surface of the light guide member are integrated in the light blocking member,
the image sensor unit further comprising:
a light condenser that focuses reflected light from the illuminated body; and
an image sensor that receives the light focused by the light condenser to convert the light to an electric signal.

9. An image reading apparatus comprising:
an illumination apparatus that linearly illuminates an illuminated body, the illumination apparatus comprising:
  a first light source;
  a second light source;
  a rod-like light guide member, wherein the first light source is arranged on one end in a longitudinal direction, the second light source is arranged on another end in the longitudinal direction, light emitted from the first light source and the second light source is propagated by a reflection surface and emitted to the illuminated body from an emission surface, the one end is a fixed end, and the other end is a free end; and
  a light blocking member comprising a surrounding portion slidably covering the other end of the light guide member, wherein
  the surrounding portion comprises: a light blocking portion protruding toward the one end of the light guide member and covering the emission surface of the light guide member; and a cut-out portion adjacent to the light blocking portion and exposing part of the reflection surface of the light guide member,
  part of light reflected by the light blocking portion the cut-out portion, and
  a locking portion locked with a portion to be locked formed on the one end of the light guide member and a coupling portion covering a reflection surface facing the emission surface of the light guide member are integrated in the light blocking member,
the image reading apparatus further comprising:
a light condenser that focuses reflected light from the illuminated body;
an image sensor unit that receives the light focused by the light condenser to convert the light to an electric signal; and
a movement portion that relatively moves the image sensor unit and the illuminated body.

* * * * *